June 3, 1930. T. STENHOUSE 1,761,372
PLUNGER OPERATING MECHANISM FOR GLASS FURNACES
Original Filed March 22, 1922  2 Sheets-Sheet 1

Inventor
Thomas Stenhouse.
Eccleston & Eccleston
Attorneys

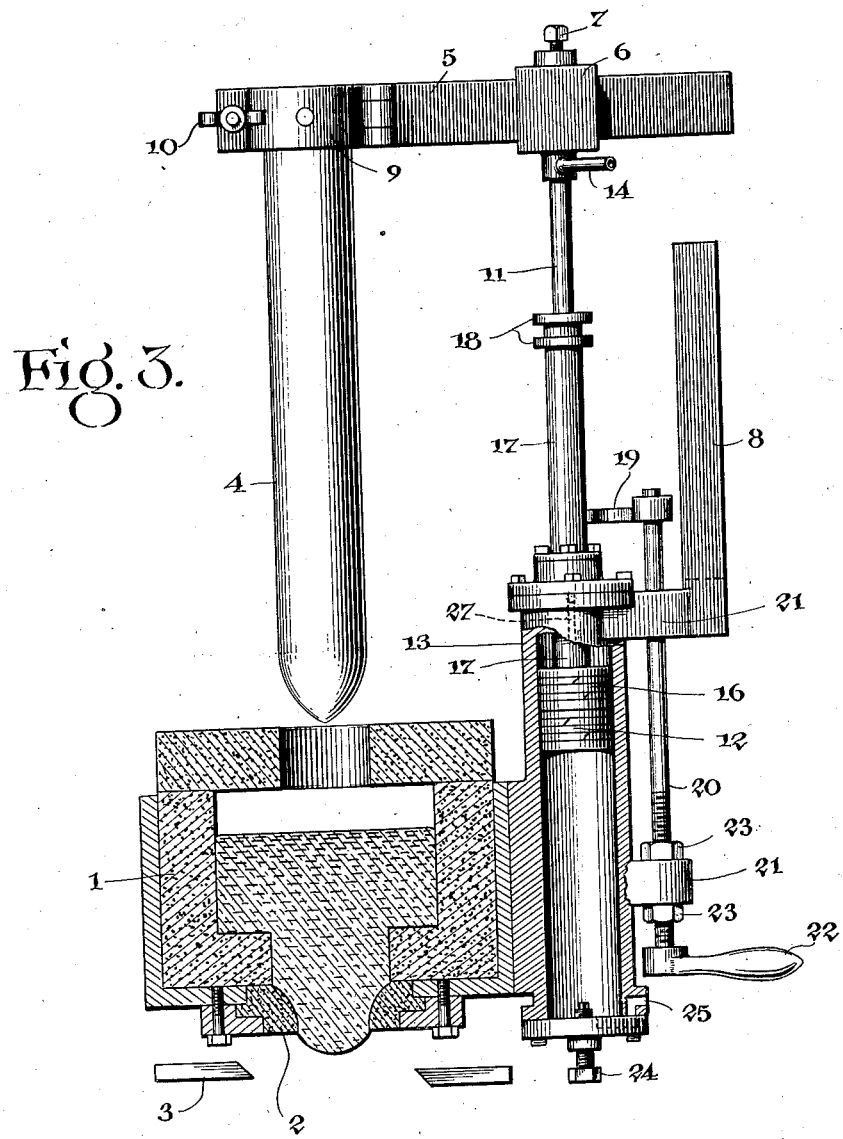

Patented June 3, 1930

1,761,372

UNITED STATES PATENT OFFICE

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

PLUNGER-OPERATING MECHANISM FOR GLASS FURNACES

Application filed March 22, 1922, Serial No. 545,764. Renewed January 19, 1926.

My invention relates to plunger operating mechanisms for glass furnaces, and one of the objects of my invention is to provide means whereby the plunger may be operated by compressed air or other fluid pressure.

Another object of my invention is to provide simple adjusting means in conjunction with the fluid operating means, whereby the operator is given perfect control of the plunger, thus enabling him to control the shape and size of the glass drops as they are fed to the molds, which is of very material importance in the glass art.

Another object of my invention resides in the provision of means whereby the plunger may be instantly withdrawn from the flow spout.

Still another object of the invention is to eliminate the costly and complex systems of gears, cams, etc., heretofore employed for operating the plunger.

A further object of the invention resides in the provision of means which will not only control the limits of the plunger stroke, but also will, at the same time, vary the effective size of the cylinder actuating the plunger, thereby providing a great saving in the use of compressed air or other fluid employed in actuating the plunger.

Other and further objects and advantages of my invention will be obvious to those skilled in the art, from the following description, when taken in connection with the accompaying drawings; in which, Figure 1 is a end elevation of the entire mechanism, showing the plunger at the end of its downward stroke; parts being broken away to more clearly show the construction.

Figure 3 is a view similar to Figure 1, but showing the plunger entirely withdrawn from the flow spout.

Figure 1:
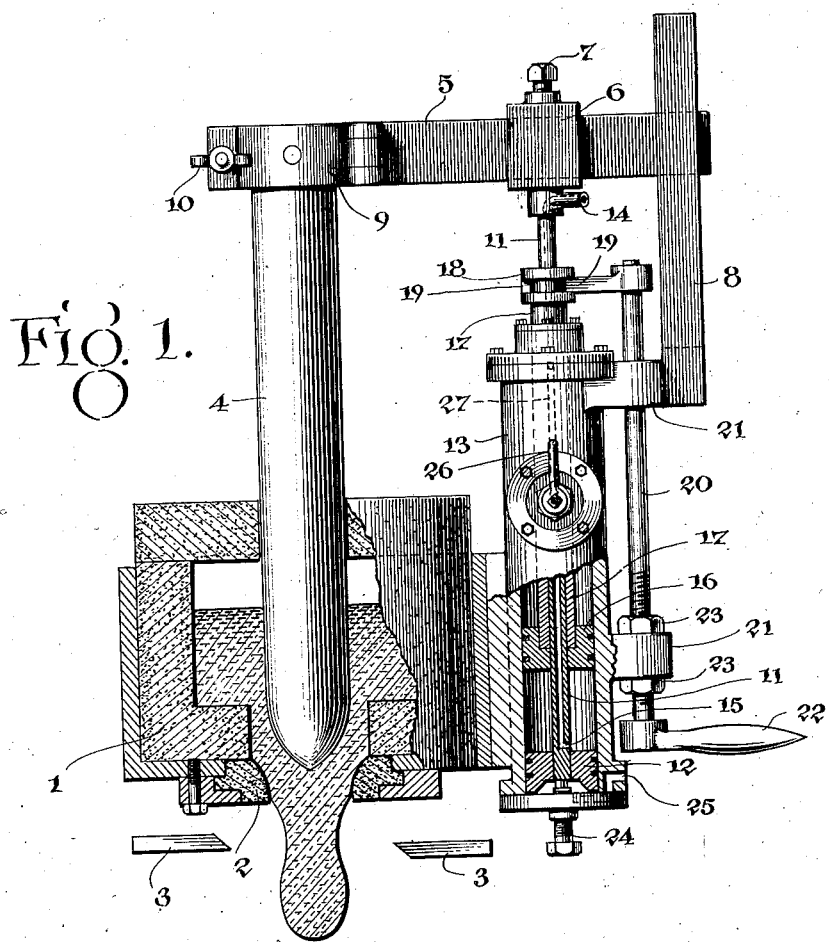
Figure 2:
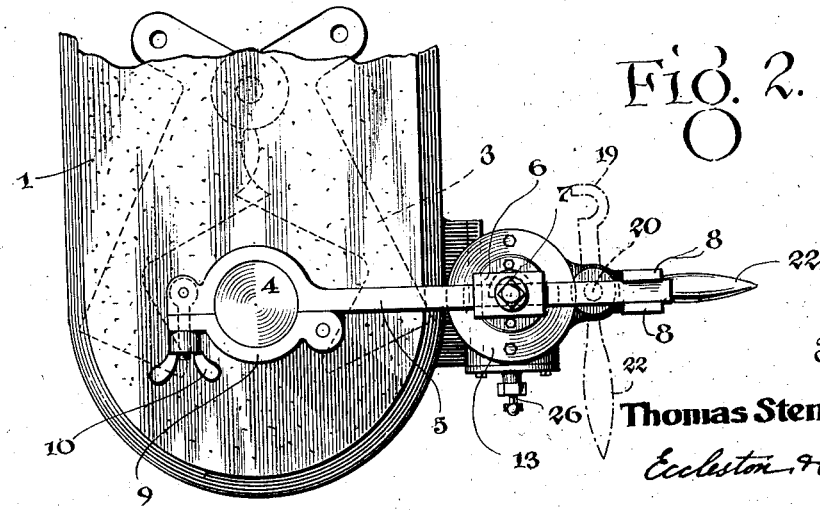
Figure 2 is a plan view of the mechanism.

Referring to the drawings more in detail, numeral 1 indicates the ordinary flow spout which is connected with a glass furnace in the usual manner. A removable bushing 2 surrounds the flow hole or orifice, and shears 3 are positioned below the orifice for shearing the glass drops. The bushing is made removable to permit a new bushing to be substituted in case of breakage, and to permit bushings of various sizes to be inserted in accordance with the capacity desired. A plunger 4 is mounted to reciprocate vertically in the flow spout in alignment with the flow hole.

The structure thus far described is old and well known in the art, and a general description of the operation thereof will suffice. As the plunger descends the molten glass flows through the flow hole in the manner indicated in Figure 1, and at the proper moment the stream is sheared, permitting the sheared portion, or glass drop, to fall into the mold. When the plunger is lifted the sheared portion of glass adhering to the plunger is drawn back into the body of glass where it is reheated.

It is also well known in the glass art that the quality of the product depends to some extent upon the particular shape which the glass drop assumes as it flows from the spout prior to being sheared. The consistency of the molten glass is, of course, one of the factors determining the shape of the glass drops. But there are various other factors which affect the shape of the glass drop, such as the length of the stroke of the plunger, the distance between the plunger and the flow hole when the former is at the end of its downward stroke, etc. In the practice of my invention the operator has perfect control over the operation of the plunger, and he is thus able to make the glass drops conform to the desired shape and size.

I will now describe the means for operating the plunger.

An extension or cross-arm 5 is mounted in a slotted head 6, and is secured thereto by means of a set screw 7. One end of the cross-arm 5 is engaged in a slot provided in the guide member 8, whereby as the arm is reciprocated it will be maintained in proper alignment. Adjacent its other end the cross-arm is curved to substantially conform to the curvature of the plunger, and hingedly attached to the cross-arm is a clamping member 9, which is clamped about the plunger by the set screw 10. The slotted head is carried by a piston rod 11 provided with a piston 12 operable in the cylinder 13.

Obviously many other means may be employed for attaching the plunger to the cross-arm, for operatively connecting the cross-arm to the piston rod, and for maintaining the parts in proper alignment, and it is therefore not my intention to be limited to the particular construction shown and described herein.

The piston rod 11 is hollow, as clearly shown in Figure 1, and it has a fluid inlet port indicated by numeral 14, and a fluid pressure outlet port indicated by numeral 15. A second piston, referred to by numeral 16, is mounted in the cylinder 13. This piston and its piston rod 17 have a passage extending therethrough; the passage being adapted to receive the piston rod 11 and permit it to reciprocate therein.

The piston rod 17 extends some distance above the top of the cylinder, and adjacent its upper end is provided with a collar 18 adapted to receive a hook-shaped latch 19. The latch is carried by a shaft 20 mounted in lugs 21, 21, and is provided with an operating handle 22 by which the shaft may be rotated to throw the latch into or out of engagement with the collar 18. A portion of the shaft is screw-threaded and carries adjusting nuts 23, 23, thereby providing means for vertically adjusting the position of the piston 16.

For adjusting the extent of the down stroke of the piston 12 and plunger 4, I provide a screw 24 mounted in the lower cylinder head of cylinder 13.

A port for supplying fluid pressure to the lower portion of the cylinder, and exhausting it therefrom, is indicated by numeral 25.

The operation of the apparatus, thus far described, is as follows:

Pressure is applied alternately above and below the piston 12, through the ports 15 and 25 respectively. The pressure is supplied to the cylinder in timed relation by any desired means, and as the manner of supplying the pressure constitutes no part of the present invention, it not deemed necessary to illustrate such a mechanism. As the pressure is applied alternately the piston 12 is caused to reciprocate, and through its connection with the plunger 4 the latter is also caused to reciprocate in the flow spout in vertical alignment with the flow hole.

As the plunger reciprocates, portions of molten glass of predetermined size will be delivered through the flow hole, to be sheared and dropped into the molds in the well known manner; and as the plunger is lifted the portion of glass adhering thereto is drawn back into the body of glass in the flow spout, where it is reheated.

But it is also well known in the glass art that the quality of the products depends to some extent on the shape that the glass drops assume as they flow from the spout prior to being sheared. In order that the operator may be able to cause the glass drops to conform to the desired shape and size, I have provided the adjustments hereinbefore described. The extent of the upward stroke of the piston 12, and hence of the plunger 4, is regulated by the position of the piston 16, and the vertical position of this piston is adjusted by means of the adjusting screws 23, 23. The extent of the downward stroke of the plunger is regulated by the screw 24, which will engage and stop the piston 12 at the desired point. By the means provided the operator is not only able to adjust the length of the stroke of the plunger, and the stopping point of the plunger on both its upward and downward strokes, but also if it should be desired he may move both adjustments the same distance in the same direction, thus maintaining the same length of stroke yet varying the position of the plunger relative to the flow orifice when at the limits of its stroke.

It will be understood, of course, that the frequency of the plunger stroke may be varied by the adjustment of the timing mechanism in any well known manner.

From the foregoing description it will be apparent that I have devised a very simple mechanism for operating a feeder plunger and for varying the limits of the plunger stroke. Referring now particularly to the operating cylinder, I will indicate the manner in which the mechanism produces a great saving in the use of compressed air or other fluid for operating the piston.

As hereinbefore described, the reciprocation of the piston 12 and piston rod 11 causes the desired reciprocation of the feed plunger 4; and the limits of stroke of the piston 12, and consequently the limits of stroke of the feed plunger 4, are adjusted by the screw 24 and the adjustable piston 16. Referring to Fig. 1, let it be assumed that it is desired to lower the upper limit of the plunger stroke. This is accomplished merely by lowering the adjustable piston 16 to the desired extent. Now it will be apparent that when the adjusting piston 16 is lowered the effective length of the cylinder and the capacity thereof are decreased, and accordingly there is a saving in the use of motive fluid. If the limits of stroke of the piston 12 should be varied without actually changing the effective length of the cylinder and the capacity thereof, it is apparent that the amount of compressed air or other fluid employed will remain substantially the same whether the piston stroke be a short one or a long one. Thus if screws were employed in both ends of the cylinder 13, for adjusting the limits of stroke, it is obvious that the length of the cylinder and capacity of the cylinder remain substantially the same, whether the screws be adjusted for a short stroke or for a long stroke, of the pistons 12. But when an adjusting piston, such as indicated by numeral 16, is employed, the length and capacity of the cylinder is varied in accordance with the length of stroke of the piston 12 and feed plunger 4.

If in case of breakage of the plunger, or because a plunger of different capacity is desired, it becomes necessary to substitute another plunger, it is highly desirable that the operation be performed in the least possible time and under the most favorable working conditions. By lifting the plunger entirely clear of the flow spout the substitution may be made very quickly and with less exposure to the heat. And also if a cap is employed over the flow spout and around the plunger, it is not necessary to remove such cap, as the plunger will be lifted entirely clear thereof. In order to instantly withdraw the plunger from the flow spout it is only necessary to rotate the handle 22, thereby releasing the latch from engagement with the piston rod 17. The upper piston 16 is now free to move, and when pressure is applied below the piston 12 it will rise, carrying the upper piston 16 with it, and also elevating the plunger clear of the flow spout. It is to be noted that the slot in the guide member is open at its upper end, and that the guide member is of such length that the cross-arm will be guided therein while the plunger is being reciprocally operated. But the length of the guide member is such that when the plunger is lifted clear of the flow spout the cross-arm will be freed from the guide member, thereby permitting the cross-arm to be rotated, so that the plunger may be swung to a position where it is easily accessible. In such a position another plunger may be quickly substituted, and the operators are not exposed to the excessive heat as is the case in the prior practice.

After the new plunger has been substituted the cross-arm is rotated back to its original position, so that the cross-arm will align with the slot in the guide member, and consequently the plunger will align with the flow hole. It is only necessary now to lower the plunger and the pistons to their operative positions.

For the purpose of lowering the plunger and pistons, I provide the cylinder 13 with a valve 26 which controls the admission of fluid pressure to the upper portion of the cylinder through the passage 27. After the pistons have been lowered the latch 19 is swung into engagement with the collar 18 of the piston rod 17, thereby locking the poston 16 in its adjusted position.

The construction and operation of the mechanism will be clearly understood from the foregoing description, and the many advantageous results thereof will be apparent.

Among the more important advantages the following may be mentioned.

The use of a fluid pressure cylinder for operating the plunger eliminates the costly and complex systems of gears, cams, etc., heretofore employed.

By the use of the fluid pressure operating means in conjunction with the various adjustments which I have provided, the operator has perfect control of the plunger, whereby he is enabled to cause the glass drops to conform to the shape and size most desirable.

By the provision of means for varying the length and capacity of the operating cylinder, in accordance with the length of stroke of feed plunger, a great saving is made in the use of compressed air or other motive fluid.

The operation of replacing the plunger is greatly facilitated by the provision of means whereby the plunger may be instantly withdrawn entirely clear of the flow spout, and whereby after being withdrawn may be swung to a position where it is easily accessible.

In accordance with the patent statutes I have described the particular embodiment of the invention shown herein, but I do not wish to be understood thereby as limiting myself or the scope of my invention, as many changes and modifications may be made without departing from the spirit of the invention, and all such I aim to include in the scope of the appended claims.

What I claim as new and desire to secure by Letters Patent is:

1. In a glass furnace, a flow spout, a plunger adapted to reciprocate in the flow spout, and a single fluid pressure cylinder for reciprocating the plunger, and for lifting the plunger clear of the flow spout.

2. In a glass furnace, a flow spout, a plunger adapted to reciprocate in the flow spout, a piston operatively connected with the plunger and adapted to reciprocate the same, the construction and arrangement being such that the piston is adapted to lift the plunger entirely clear of the flow spout.

3. In a glass furnace, a flow spout, a plunger adapted to reciprocate in the flow spout, a fluid pressure operated piston rod adapted to reciprocate the plunger, said piston rod having a passage extending therethrough, whereby pressure is supplied to the interior of the cylinder.

4. In a glass furnace, a flow spout, a plunger adapted to reciprocate in the flow spout, a cylinder and piston adapted to reciprocate said plunger, a second piston arranged in said cylinder, means for adjusting said second mentioned piston vertically, whereby the length of stroke of the first mentioned piston is varied, and means for releasing said second mentioned piston, whereby the first mentioned piston may lift the plunger clear of the flow spout.

5. In a glass furnace, a flow spout, a plunger adapted to reciprocate in the flow spout, a cylinder and piston adapted to reciprocate the plunger, means for varying the lower limit of the plunger stroke, a second piston mounted in the cylinder and telescopically receiving the piston rod of the first mentioned piston, means for adjusting the second mentioned piston vertically, whereby the upper limit of the first mentioned piston is varied, and means for releasing said second mentioned piston, whereby the first mentioned piston may lift the plunger clear of the flow spout.

6. In a glass furnace, a reciprocable plunger, a cylinder and piston for reciprocating said plunger, means arranged within the cylinder for adjusting the upper limit of the piston stroke, and means for releasing said adjusting means, so that it may be freely moved by the piston.

7. In a glass furnace, a reciprocable plunger, a cylinder and piston for operating said plunger, a second piston adjustably mounted in the cylinder for varying the length of stroke of the first mentioned piston, a collar provided on the piston rod of the second mentioned piston, a member adapted to engage said collar and hold the second mentioned piston in position, and means for releasing said member from engagement with the collar, whereby the second-mentioned piston is freely movable by the first-mentioned piston.

8. In a glass furnace, a reciprocable plunger, a cylinder and piston for operating said plunger, a second piston adjustably mounted in the cylinder for varying the length of stroke of the first mentioned piston, a collar provided on the piston rod of the second mentioned piston, a member adapted to engage said collar and hold the second mentioned piston in position, means for vertically adjusting the second mentioned piston, and means for releasing said member from engagement with the collar, whereby the second-mentioned piston is freely movable by the first-mentioned piston.

9. In a glass furnace, a reciprocable plunger, a fluid pressure operated piston rod, a cross-arm mounted intermediate its ends on the piston rod, the reciprocable plunger being attached to one end of the cross-arm, a guide member in which the opposite end of the cross-arm is slidably mounted, means for reciprocating the plunger within the flow spout and for elevating the plunger clear of the flow spout and the cross-arm clear of the guide member.

10. In a glass furnace, a reciprocable plunger, a fluid pressure operated piston rod, a cross-arm mounted intermediate its ends on the piston rod, the reciprocable plunger being attached to one end of the cross-arm, an open ended guide member in which the opposite end of the cross-arm is slidably mounted, and means for elevating the cross-arm to free it from the guide member, whereby the plunger may be rotated about the piston as an axis.

11. In a glass furnace, a flow spout, a plunger adapted to reciprocate in the flow spout, a fluid pressure operated cylinder and piston for reciprocating the plunger in the flow spout and for elevating it clear of the flow spout solely by movement of the piston, and means for guiding the plunger during the reciprocation thereof, said guiding means being rendered inoperative by elevating the plunger clear of the flow spout.

12. In a glass furnace, a flow spout, a plunger adapted to reciprocate in the flow spout, a fluid pressure operated cylinder and piston and piston rod for reciprocating the plunger in the flow spout and for elevating it clear of the flow spout solely by movement of the piston, a cross-arm carried by the piston rod, said plunger carried by the cross-arm, and guiding means for preventing rotation of the cross-arm while it is being reciprocated, said guiding means being rendered inoperative by elevating the plunger clear of the flow spout, whereby the plunger may be rotated about the cylinder as an axis.

13. In a glass furnace, a flow spout, a plunger adapted to reciprocate in the flow spout, a cross-arm carrying the plunger, a cylinder and piston operatively connected with the cross-arm, means for reciprocating said piston, whereby the plunger is reciprocated, and means for lifting the piston sufficiently to cause the plunger to clear the flow spout, and means whereby the plunger may be rotated about said piston as an axis when it is clear of the flow spout.

14. In a glass furnace, a flow spout having a flow orifice, a feeder member controlling said orifice, a cylinder, a reciprocable piston mounted in said cylinder and having a hollow piston rod operatively connected with the feeder member, said hollow piston rod having an opening communicating with the interior of the cylinder, and an adjustable piston arranged within said cylinder.

15. In a glass furnace, a flow spout having a flow orifice, a feeder member controlling said orifice, a cylinder, a reciprocable piston mounted in said cylinder and having a piston rod operatively connected with the feeder member, a second piston mounted in said cylinder to embrace said piston rod and being relatively movable with respect thereto, and means for vertically adjusting the second-mentioned piston.

THOMAS STENHOUSE.